United States Patent
Carter

(10) Patent No.: US 7,188,585 B1
(45) Date of Patent: Mar. 13, 2007

(54) SHOCK ABSORBER LEASH

(76) Inventor: Stephen Anthony Carter, 3063 Wellington, Port Coquitlam, B.C. (CA) V3B 3X3

( * ) Notice: Subject to any disclaimer, the term of this patent is extended or adjusted under 35 U.S.C. 154(b) by 13 days.

(21) Appl. No.: 11/204,841

(22) Filed: Aug. 17, 2005

(51) Int. Cl.
*A01K 27/00* (2006.01)
(52) U.S. Cl. ..................................... 119/798
(58) Field of Classification Search ............. 119/792, 119/798, 795, 772
See application file for complete search history.

(56) References Cited

U.S. PATENT DOCUMENTS

| | | | |
|---|---|---|---|
| 4,488,511 A | 12/1984 | Grassano | |
| 5,038,719 A * | 8/1991 | McDonough | 119/772 |
| 5,718,189 A * | 2/1998 | Blake | 119/792 |
| 5,732,662 A * | 3/1998 | Jacobsen | 119/798 |
| 5,732,663 A | 3/1998 | Manzella | |
| 5,749,326 A | 5/1998 | Jones et al. | |
| 5,873,328 A * | 2/1999 | Campbell | 119/798 |
| 6,564,754 B1 | 5/2003 | Cohen | |
| 6,971,334 B1 * | 12/2005 | Livesay et al. | 119/798 |
| 2001/0015179 A1 | 8/2001 | Fountoulakis | |
| 2002/0005175 A1 | 1/2002 | Donovan et al. | |
| 2003/0140871 A1 | 7/2003 | Levine | |
| 2004/0200436 A1 | 10/2004 | Staack | |
| 2004/0216695 A1 | 11/2004 | Stovall | |
| 2005/0229868 A1 * | 10/2005 | Young | 119/798 |

* cited by examiner

*Primary Examiner*—Thomas Price
(74) *Attorney, Agent, or Firm*—Frederick Kaufman

(57) ABSTRACT

A shock absorber leash incorporates grasping, attaching and elongated strap assemblies. The latter incorporates a strap subassembly, having a strap of non elastic, continuous structure for connecting the grasping and attaching assemblies, and a resilient, adjustable in length subassembly including an elastic strip having its ends attached to a cam-buckle for adjusting a length of the elastic strip. The resilient, adjustable in length subassembly is interposed laterally between the ends of a segment of the strap. The segment is provided adjacent to its ends with a first and second rings and forms a loop when the resilient, adjustable in length subassembly is not completely stretched. The latter is detachable from a remaining of the shock absorber leash by means of the cam-buckle and a free passage of the elastic strip through the first and second rings.

2 Claims, 5 Drawing Sheets

SHOCK ABSORBER LEASH

I. BACKGROUND OF THE INVENTION

1. Field of the Invention

The present invention relates generally to animal leashes and, more particularly, to a shock absorber leash.

2. Description of the Prior Art

As is well known by those familiar with the raising and training animals, animals are born with their natural, essentially wild instincts substantially intact, and, therefore, it is recognized that the domestication of animals requires training to overcome the animal's innate, inborn natural instincts.

Attempts have been made in the past to introduce a better shock absorber for elastically and resistively yield to stretching and jerking applied thereagainst by a struggling animal being tied that has to endure all such without damage or breaking until its inherent instinct to free itself from restraint has been overcome and broken by a training exercise. Therefore, a safe and humane device was always necessary for training animals to accept being tied, while substantially eliminating injury to the animal during training. Furthermore, a well designed device must reduce the impact applied from an animal, through the leash, to the wrist of a user holding the handle of the latter, or/and to user's shoulder.

Keeping in mind the fact that small animals, such as dogs, differ in weight, size, age, breed, etc., a leash capable to accommodate this variety and provide a "comfort zone" in use for the animal and user constitutes yet a not solved problem.

Among the patents presenting some similarities with the present invention, one can mention the following:

U.S. Patent Application Publication No. 2003/0145804 A1, published Aug. 7, 2003, inventor Carlo Vaccari and entitled "LEAD WITH ERGONOMIC HANDGRIP" describes a lead with a series of rigid elements alternating with a series of elastic elements designed to act as a shock absorber for any jerks caused by abrupt accelerations and decelerations of the animal. This lead presents mainly two shortcomings. First, a structure comprising alternating rigid and elastic elements requires a specialized factory to manufacture this combination. Second, no means to adjust the length of the foregoing structure are considered. U.S. Patent Application Publication No. 2003/0056338 A1, published Mar. 27, 2003, inventor Joseph Anscher and entitled "SHOCK ABSORBING STRAP ATTACHMENT DEVICE" discloses a device that connects to a strap for absorbing the shock when the strap is suddenly pulled. The device has a frame with two longitudinal sides and a series of lateral guides disposed along the frame between the two sides. The guides define openings through which a strap extends. When the strap is inserted into the device, it is placed through the openings and over guides. The guides also hold the strap in place so that the device does not slide off the strap. In the relaxed state, the attachment device maintains a serpentine configuration with peaks and valleys. When tension is applied, the device is stretched out, but returns to the original serpentine configuration when the tension is removed. The shape and material help absorb the force applied to the strap and reduce its effect on the strap, to thus reduce breakage of the strap and buckles and reduce injury to the user. Anscher's device presents the following disadvantages: First, the device is complicated and cumbersome. Second, no means to adjust the device for specific conditions of use are contemplated.

U.S. Pat. No. 5,873,328, granted to Campbell on Feb. 23, 1999 for a "PET LEASH WITH LENGTH-LIMITED ELASTIC SECTION" relates to a leash assembly. The latter includes a handle and an elongate strap connected at one end of the handle, the other end being adapted to be connected to a collar worn by the dog. An elastic element has a first length when in a relaxed state and is extensible four inches to a second length when fully extended. The elastic element is attached to the strap with the length of the strap between attached ends of the elastic element substantially equal to the second length. The force required to reach the fully extended state is about 5 pounds or 2.3 kilograms. The leash assembly described in this patent contain a main disadvantage. There is no means provided for adjusting the length of the elastic element to correlate with a usual force applied by a certain dog. U.S. Pat. No. 5,146,876, granted to McPhail on Sep. 15, 1992 for a "SHOCK ABSORBER LEASH" relates to an extendable elastic leash. This leash has both elastic and non-elastic members, the elastic member being parallel to a first non-elastic member and when the elastic member is at its full extension, the length of the elastic member and the parallel first non-elastic member are the same. The main shortcomings of this extendable elastic leash reside in the fact that the elastic member has a constant length and the non-elastic member is not continuous.

II. SUMMARY OF THE INVENTION

The subject invention now addresses a number of shock absorber leash design concerns. For example, does the leash provide a comfort zone of work required by a user? If the requirements of the user are not provided by a certain elastic subassembly, can the latter be easily detached from the leash and replaced with another elastic subassembly having adequate limits for achieving a convenient comfort zone?

Accordingly, the Applicant believes that there is a need for a shock absorber leash that overcomes the disadvantages of the prior art and also addresses the foregoing concerns. Hence,

- a first objective of the present invention is to design a well engineered shock absorber leash for animals, which is simple to manufacture, easy to use and the
- a second objective of the present invention is to develop a resilient subassembly for the shock absorber leash, which can be easily adapted to the magnitude of forces transmitted to the leash by the animal; and
- a third objective of this invention is to devise a resilient subassembly for the shock absorber leash that can be easily detached and replaced when is worn out or when another resilient subassembly having a different force/distance characteristic of the elastic structure is more suitable to achieve a "comfort zone" for the animal and the trainer.

The present invention is directed towards a shock absorber leash comprising in combination, at its proximal end,
- a grasping assembly for firmly holding the "shock absorber leash" when dealing with an animal; and at its distal end,
- an attaching assembly for fastening to the animal;

an elongated strap assembly including
- a strap subassembly having a strap of non elastic, continuous structure for connecting the grasping and attaching assemblies;

a resilient, adjustable in length subassembly including an elastic strip having its ends attached to a cam-buckle for adjusting a length of the elastic strip, the resilient, adjustable in length subassembly being interposed laterally between the ends of a segment of the strap, the segment being provided adjacent to its ends with a first and second rings and forming a loop when the resilient, adjustable in length subassembly is not completely stretched; the resilient, adjustable in length subassembly being detachable from a remaining of the shock absorber leash due to a use of the cam-buckle and a free passage of the elastic strip through the first and second ring.

In one aspect of this invention, the grasping assembly includes a tubular handle comprising
  a tubular element made to resist deformation and breaking;
  a sleeve in which the tubular element is inserted; and
  a pair of grommets, press fitted into extremities of the tubular element, so that a translation of the sleeve along the tubular element is prevented;

the attaching assembly includes a clasp comprising
  a bracket pivotally joined to the strap subassembly;
  a hook pivotally joined to the bracket; and
  a spring operated element for closing the hook;

the strap subassembly having an end of the strap, which after leaving grasping assembly and passing through the first ring is folded back upon itself and, then, superposed and permanently joined by conventional means for securing to a remaining of the strap, thus forming a first secured connection; another end of the strap, after leaving the grasping assembly and participating, as a superposed component, in the first secured connection, extends into the segment, respectively the loop, then is doubled back upon itself and, after passing through the second ring, returns and is superposed on and permanently joined by the conventional means for securing to the remaining of the strap, thus forming a second secured connection; subsequently, the strap first passes through an adjustable buckle for adjusting an effective length of the strap, second passes through the bracket of the clasp, third passes again through the adjustable buckle and, finally, through a first pull ring; after passing through the latter, the strap is doubled back and permanently joined by the conventional means for securing to the remaining of the strap, thus forming a third secured connection;

the resilient, adjustable in length subassembly including the elastic strip and the means for buckling including a cam-buckle of double bar type, one end of the elastic strip entering from one side of a bar and exiting from another side of the bar to form together a pair of the elastic strips, superposed, the latter traversing the first and second rings, then returning to the cam-buckle for passing adjacently another bar of the cam-buckle for exiting from the latter; the elastic strip, impliedly, the pair of the elastic strips, superimposed, being so dimensioned in length as to bias the ends of the segment toward each other, whereby upon application of a sharp, corrective pull on the shock absorber leash by an animal trainer, the elastic strip elongates, while upon relaxation of the shock absorber leash, the elastic strip shortens and once again places the ends of the segment in their normal spaced relation relative each other.

III. BRIEF DESCRIPTION OF THE DRAWINGS

Although the characteristic features of the invention will be particularly pointed out in the claims, the invention itself and the manner in which it may be made and used may be better understood by referring to the following description and accompanying drawings. Like reference numerals refer to like parts throughout the several views of the drawings in which:

IV. DESCRIPTION OF THE PREFERRED EMBODIMENTS

The present invention can be best understood upon review of the accompanying—figures and their following description.

Figure 1:
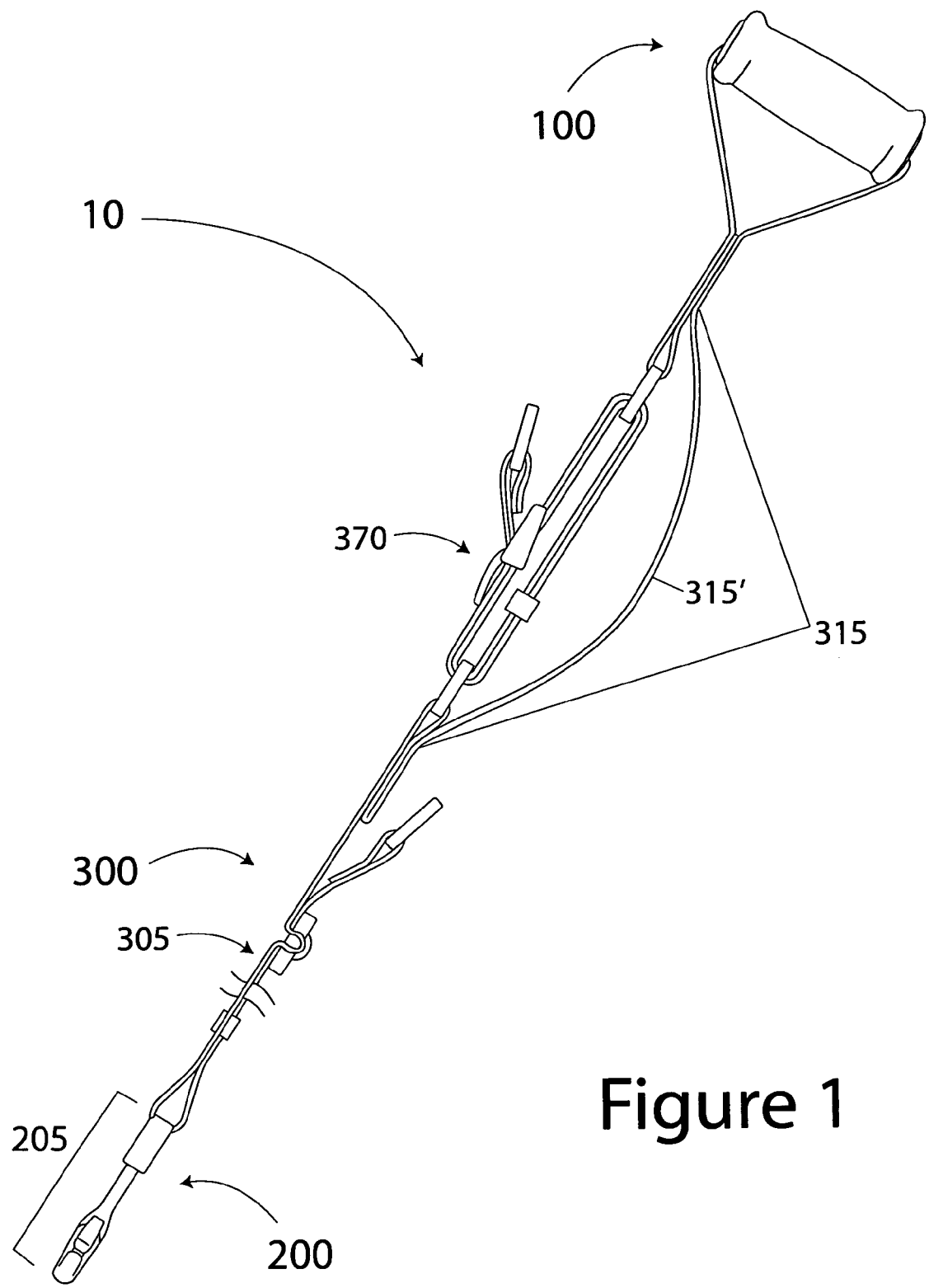
FIG. 1 is a side elevation view illustrating one embodiment of this invention.

FIG. 1 illustrates an embodiment of a shock absorber leash for animals 10. The latter comprises, at its proximal end,
  a grasping assembly 100 for firmly holding shock absorber leash 10 when dealing with an animal; and at its distal end,
  an attaching assembly 200 for fastening to the animal;

an elongated strap assembly 300 including
  a strap subassembly 305 having a strap 310 of non elastic, continuous structure for connecting grasping and attaching assemblies 100 and 200, respectively;
  a resilient, adjustable in length subassembly 370 including an elastic strip 375 having its ends attached to a cam-buckle 380 for adjusting a length of elastic strip 375, resilient, adjustable in length subassembly 370 being interposed laterally between the ends of a segment 315 of strap 310, segment 315 being provided adjacent to its ends with a first and second D-rings 320 and 325 and forming a loop 315' when resilient, adjustable in length subassembly 370 is not completely stretched; resilient, adjustable in length subassembly 370 being detachable from a remaining of shock absorber leash 10 due to a use of cam-buckle 380 and free passage of elastic strip 375 through D-rings 320 and 325.

Figure 2:
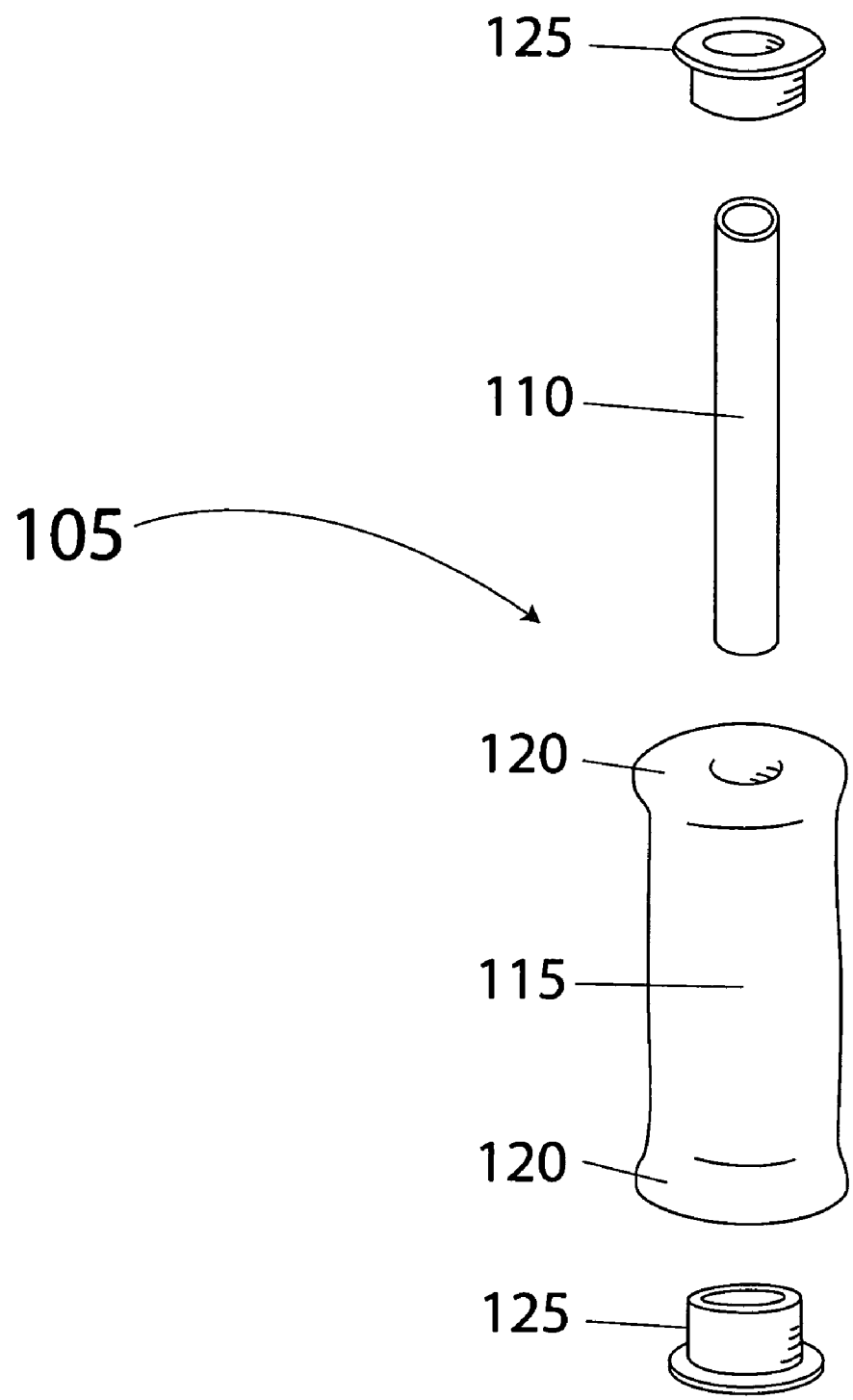
FIG. 2 is an exploded perspective view of a tubular handle of the grasping assembly.

Grasping assembly 100 is illustrated in FIGS. 1 and 2 as a tubular handle 105. In the present embodiment, tubular handle 105 incorporates
  a tubular element 110, made of PVC and provided with a thick wall to resist deformation and, eventually, breaking;
  a sleeve 115 forming an integral part with a rim 120 at each extremity, is made of foam or soft plastic material, and is used for insertion of tubular element 110; and
  a pair of grommets 125, press fitted into extremities of tubular element 110, so that a translation of sleeve 115 along tubular element 110 is prevented.

Figure 3:
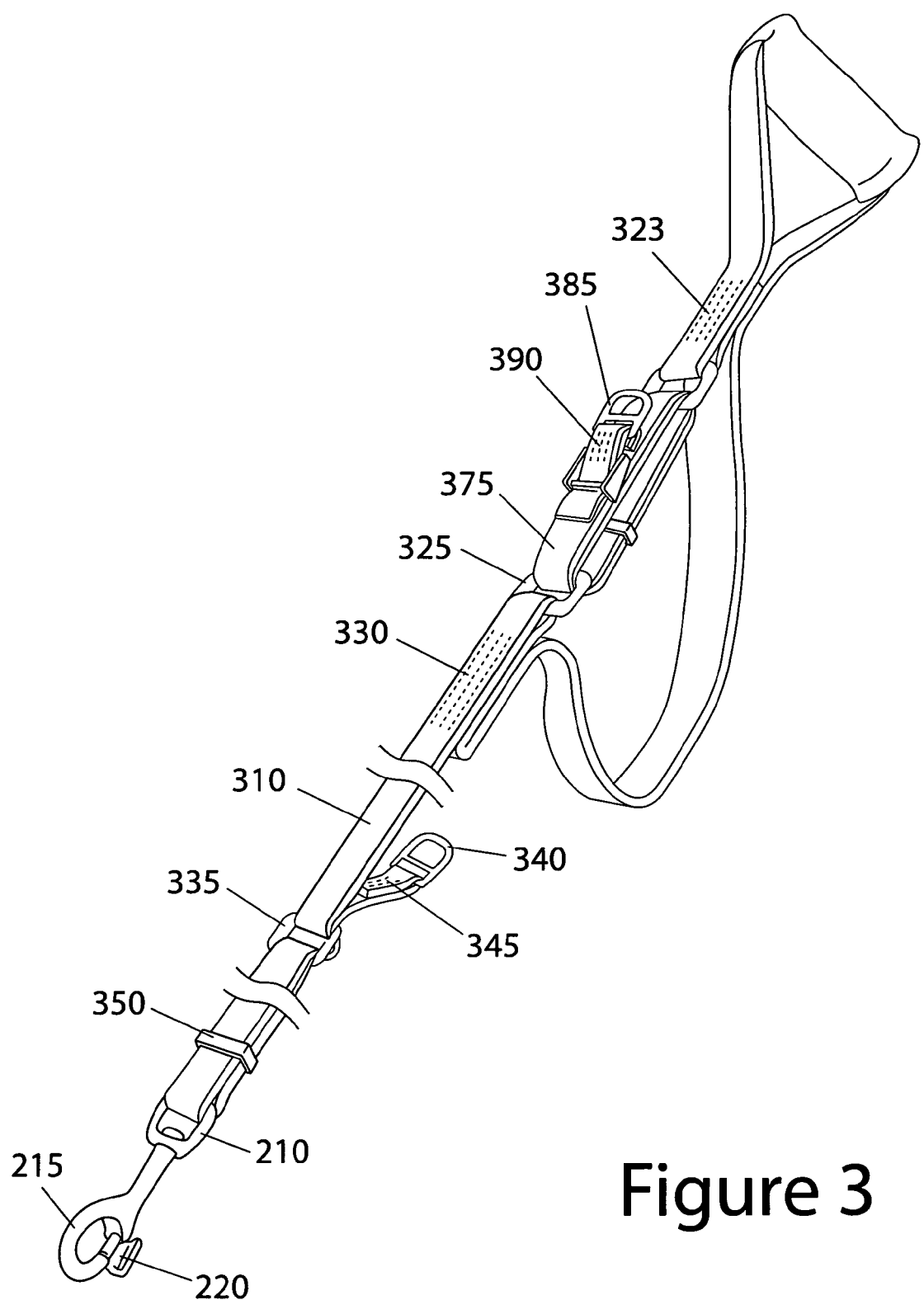
FIG. 3 is a perspective view of the shock absorber leash of FIG. 1.

Grasping assembly 100 may also be any appropriate structure that can be grasped by the user. It may be, besides the foregoing structure, a free end of strap 310, a loop of material made from the latter, or the loop could be combined with a tubular handle 105. Attaching assembly 200 (see FIGS. 1 and 3) comprises a clasp 205 that incorporates
a bracket 210 pivotally joined to strap assembly 310;
a hook 215 pivotally joined to bracket 310; and
a spring operated closer pin 220 for closing hook 215.

Other clasps readily available on the market can be used. For example, for large animals, clasps using a spring return tongue for closing are available.

As mentioned before, elongated strap assembly 300 basically comprises strap subassembly 305 and resilient, adjustable in length subassembly 370. Strap subassembly 305 incorporates strap 310 of continuous and unitary structure, made of non elastic material. In the present embodiment, strap 310 is a relatively narrow web or strip, of substantially non elastic material. Strap 310 may also be nylon, for example, a braided nylon strap, but may also be made from any equivalent or appropriate material, for instance, a natural material, such as cotton, sisal, jute and hemp, or synthetic material, such as polypropylene or polyester, or their equivalents. For example, when restraining large animals, the strap may be braided steel cable.

Though the term "strap" will be used throughout this description and in the claims, it should be understood that in the context of the terminology used for leashes, this term may be interchangeably equivalent to "cord", "lead" or "strip".

A first end of strap 310, after leaving tubular handle 105 and passing through a first D-ring 320, is doubled back upon itself and, then, superposed on and permanently joined by stitching to remaining of strap 310. A first stitch 323 is formed.

Another end of strap 310, after leaving tubular handle 105, participates, as a superposed component, in first stitch 323, then extends into segment 315, respectively loop 315'. In continuation, strap 310 is doubled back upon itself and, after passing through a second D-ring 325, returns and is superposed on and permanently joined by stitching to the remaining of strap 310. Thus, a second stitch 330 is formed. Subsequently, strap 310 passes first through an adjustable buckle 335 for adjusting an effective length of strap 310, second—through bracket 210, third—again through adjustable buckle 335 and, finally, through a first pull ring 340. Strap 310, after passing through first pull ring 340, is doubled back upon itself and, eventually, stitched. Thus, a third stitch 345 is formed. An attaching bracket 350 is used to keep together two superposed straps 310 and thus, to prevent a formation of a loop in a zone between bracket 210 and adjustable buckle 335. Resilient, adjustable in length subassembly 370 includes elastic strip 375, generally interposed laterally between the ends of segment 315, more precisely passing through and interconnecting first and second D-rings 320 and 325, respectively. Cam-buckle 380 of double bars type (bars not shown) is used. More specifically, one end of elastic strip 375 enters from one side of a bar and exits from another side of the bar. A pair of superimposed elastic strips 375 is formed. Now the later, after traversing as a pair, first and second D-rings 320 and 325 returns to cam-buckle 380, passes adjacently a second bar and exits from cam-buckle 380. The ends of the pair of superimposed elastic strips 375 pass throughout a second pull ring 385, then is doubled back upon itself and, eventually, stitched. Thus, a fourth stitch 390 is formed. The elastic strip 375, impliedly the pair of superimposed elastic strips 375 is so dimensioned in length as to bias the ends of segment 315 toward each other. Upon application of a sharp, corrective pull on shock absorber leash 10 by an animal trainer, elastic strip 375 elongates, while upon relaxation of shock absorber leash 10, elastic strip 375 shortens and once again places the ends of segment 315 in their normal spaced relation relative to each other.

Resilient, adjustable in length subassembly 370 can be easily detached and replaced when is worn out or when another resilient subassembly 370 having a different force/distance characteristic of elastic strip 375 is more suitable to achieve a "comfort zone" for the animal and the trainer. Keeping in mind, as mentioned before, that animals, for example dogs, differ in weight, size, age, breed, etc., one cannot say that one resilient, adjustable in length subassembly 370, even adjustable, will accommodate all the above differences. The fact that resilient, adjustable in length subassembly 370 offers a range of adjustments, does not mean it is completely versatile. Therefore, the fact that resilient, adjustable in length subassembly 370 is also detachable provides, when it is required, the possibility of substituting a compatible elastic strip 375 for one less suitable.

Elastic strip 375 is, by itself, preferably a woven or non-woven web of fabric that incorporates elastically deformable fibers or other resilient elements. The use of a fabric-based elastic strip, as opposed to a rubber band type elastic strip, permits to fixedly secure the ends of elastic strip 375 by stitching.

Figure 4:
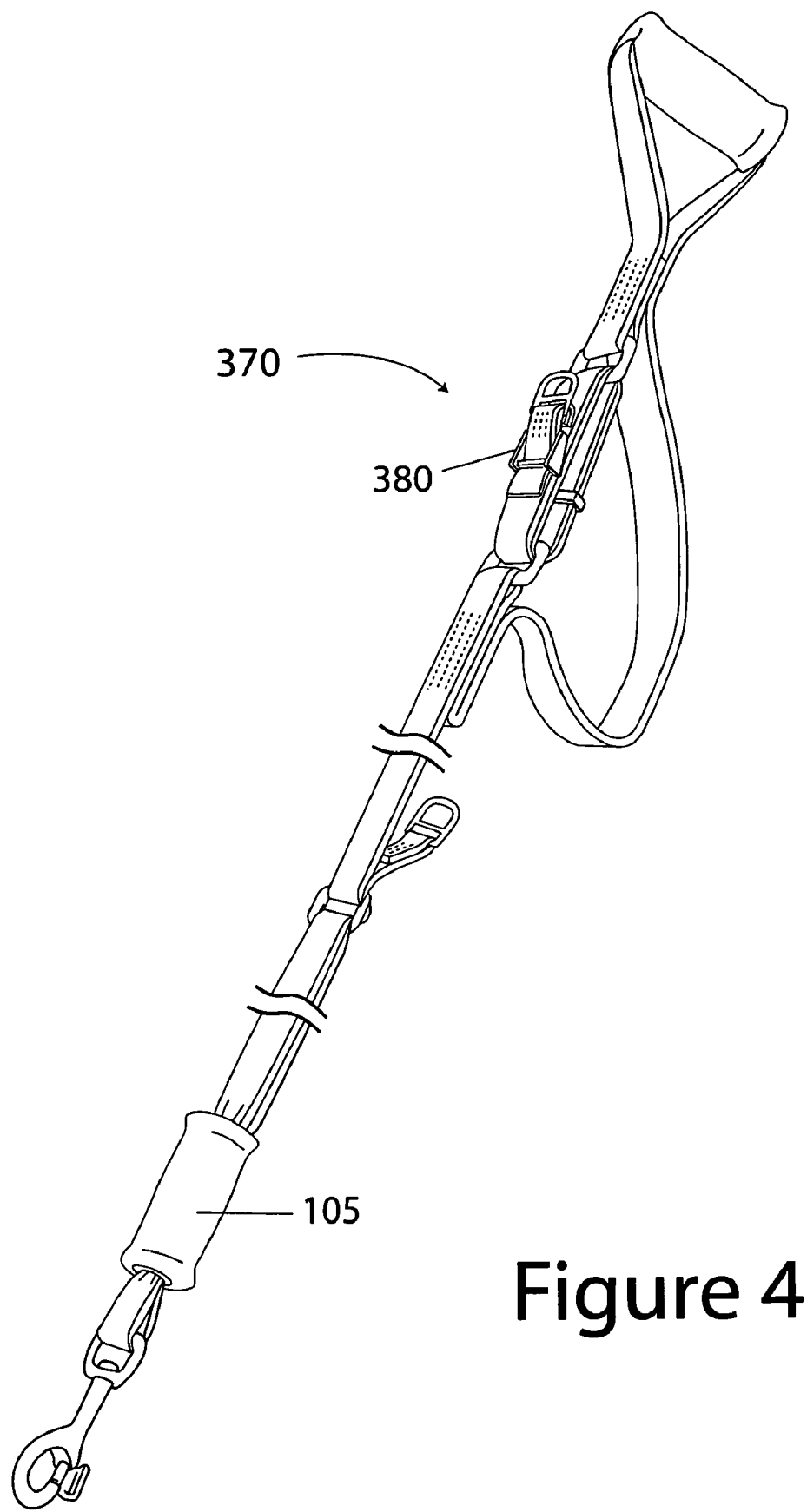
FIG. 4 is a perspective view of a variant of the shock absorber leash of FIGS. 1 AND 3.

In one variant, to facilitate the handling of more difficult animals, use is made of an extra tubular handle 105 (see FIG. 4).

Figure 5:
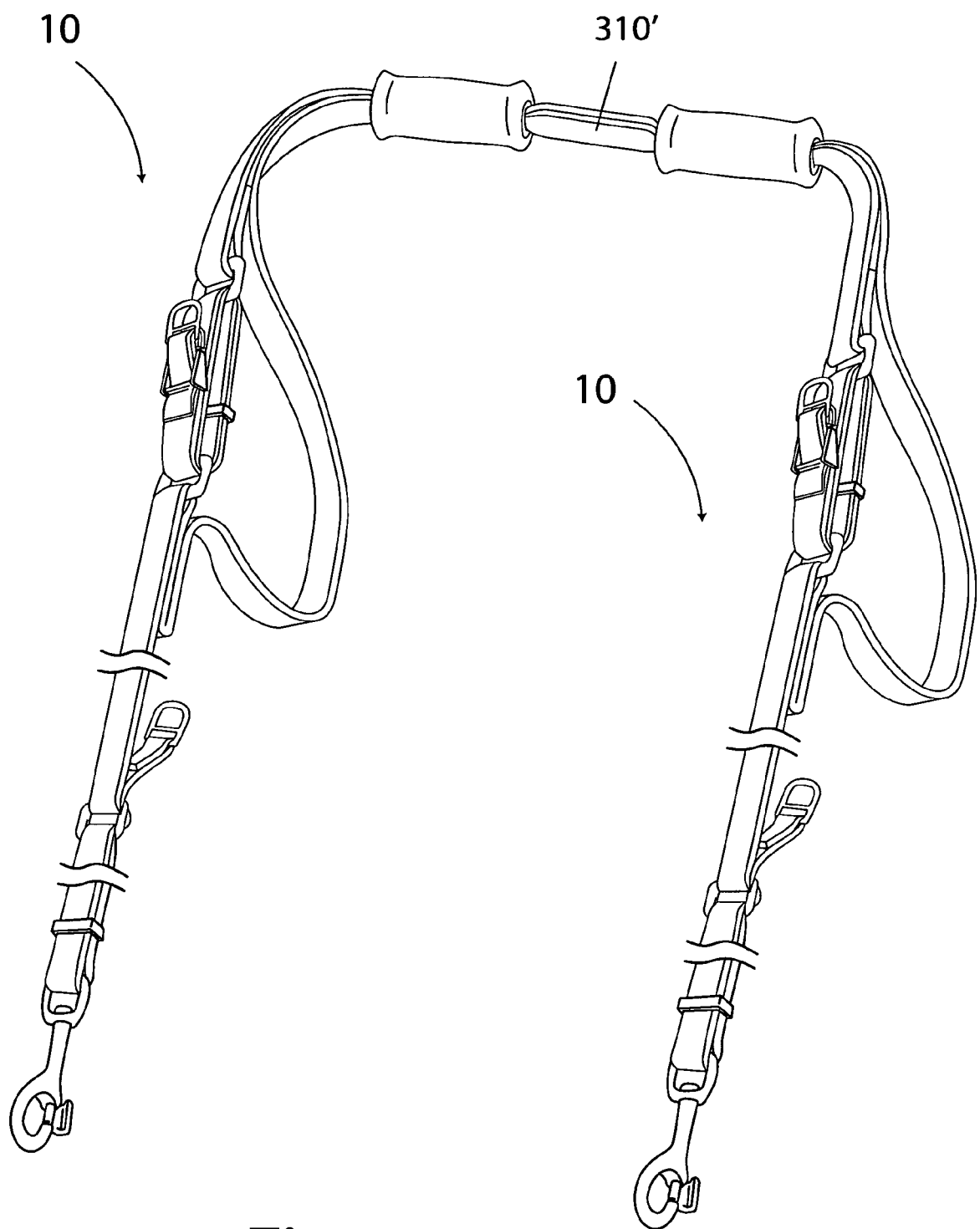
FIG. 5 is another embodiment of the present invention.

In one embodiment of the present invention (see FIG. 5), when a large animal is handled, for example a horse, use is made of a pair of parallel shock absorber leashes 10, provided with one continuous non elastic strap 310' for both parallel shock absorber leashes 10 of the foregoing pair.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as representative basis for teaching one skilled in the art to variously employ the present invention in virtually any appropriately detailed structure.

What I claim is:

1. A shock absorber leash comprising in combination,
at its proximal end,
means for grasping used for holding said shock absorber leash when dealing with an animal;
and at its distal end,
means for attaching for fastening to the animal;
an elongated strap subassembly including
means for strapping comprising a strap of non elastic, continuous structure for connecting said means for grasping with said means for attaching;
means for length adjusting including an elastic strip having its ends attached to a means for buckling used for adjusting a length of said elastic strip, said means for length adjusting being interposed laterally between the ends of a segment of said strap, said segment of said strap being provided adjacent to its ends with a first and second rings and forming a loop when said means for length adjusting is not completely stretched; said means for length adjusting being detachable, when required, from a remaining of said shock absorber leash by using said means for buckling and a free passage of said elastic strip through said first and second ring.

2. The shock absorber leash, as defined in claim 1, wherein said means for grasping includes a tubular handle incorporating
- a tubular element made to resist deformation and breaking;
- a sleeve in which said tubular element is inserted; and
- a pair of grommets, press fitted into extremities of said tubular element, so that a translation of said sleeve along said tubular element is prevented;

said means for attaching comprising a clasp that incorporates
- a bracket pivotally joined to said means for strapping;
- a hook pivotally joined to said bracket; and
- a spring operated element for closing said hook;

said means for strapping having an end of said strap, which after leaving said means of grasping, passes through the first ring and is folded back upon itself and, then, superposed and permanently joined by stitching to a remaining of the strap, thus forming a first stitch; another end of the strap, after leaving said means for grasping and participating, as a superposed component, in said first secured connection, extends into said segment, respectively said loop, then is doubled back upon itself and, after passing through said second ring, returns and is superposed on and permanently joined by said conventional means for securing to said remaining of said strap, thus forming a second secured connection; subsequently, said strap first passes through an adjustable buckle for adjusting an effective length of said strap, second, passes through said bracket of said clasp, third, passes again through said adjustable buckle and, finally, through a first pull ring; after passing through the latter, said strap is doubled back and permanently joined by said conventional means for securing to said remaining of said strap, thus forming a third secured connection;

said means for length adjusting including said elastic strip and said means for buckling, the latter being a cam-buckle of double bar type, one end of said elastic strip entering from one side of a bar and exiting from another side of said bar to form together a pair of said elastic strips, superposed, the latter traversing said first and second rings, then returning to said cam-buckle for passing adjacently another bar of said cam-buckle for exiting from the latter; said elastic strip, impliedly said pair of said elastic strips, superimposed, being so dimensioned in length as to bias said ends of said segment toward each other, whereby upon application of a sharp, corrective pull on said shock absorber leash by an animal trainer, said elastic strip elongates, while upon relaxation of said shock absorber leash, said elastic strip shortens and once again places said ends of said segment in their normal spaced relation relative each other.

* * * * *